Aug. 23, 1949.
J. JOHNSON
2,479,935
METHOD FOR FORMING COATED OPTICAL ELEMENTS
FROM POLYMERIZABLE MATERIALS
Filed March 13, 1947
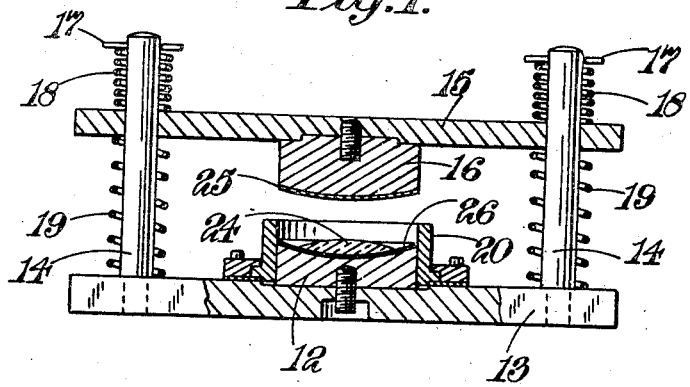
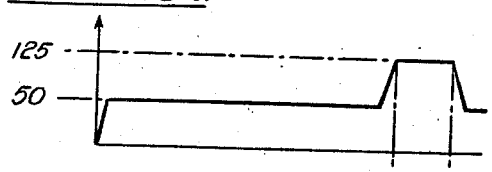
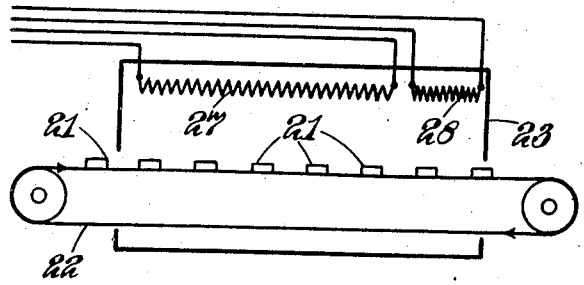
John Johnson
Inventor
by his attorneys
Stebbins, Blenko & Webb Patented Aug. 23, 1949

2,479,935

UNITED STATES PATENT OFFICE 2,479,935

METHOD FOR FORMING COATED OPTICAL ELEMENTS FROM POLYMERIZABLE MATERIALS

John Johnson, Slough, England, assignor to Combined Optical Industries Limited, Slough, England, a British company Application March 13, 1947, Serial No. 734,528
In Great Britain February 11, 1947

15 Claims. (Cl. 18—59)

This invention relates to improvements in forming optical elements of the type which are formed by the polymerisation of a transparent polymerisable material between optically accurate dies. By the term "optical elements" in this specification and appended claims is meant lenses, prisms and all similar devices used to refract or reflect light suitable for instruments of precision e. g., cameras, field and opera glasses, telescopes, microscopes and the like. The term also includes flat or curved sheets of transparent material.

It is an object of the present invention to produce an optical element of the type described with outer surfaces of a material other than that of the core of the lens. In particular it is an object of the invention to provide optical elements of the type described having shock resisting cores and abrasion resisting surfaces.

According to the present invention a method of producing an optical element from at least one artificial resin comprises the steps of coating the faces of a pair of optically accurate dies with a thin layer of transparent material, inserting between the dies a quantity of transparent polymerisable liquid and polmerising the liquid whereby an element having a core of the polymerised material and outer surfaces of the material with which the dies are covered is formed.

Preferably the dies are coated with a layer of abrasion resisting material which may be a partially polymerised cross-linked artificial resin. The element is then given a hard surface which prevents chipping or scratching.

The abrasion resisting material may be dissolved in a solvent such as ethylene dichloride before application to the dies.

Preferably the polymerisable liquid is the monomer of a thermoplastic material or a partially polymerised thermoplastic material. Thus the liquid may be partially polymerised methyl methacrylate, and the coating for the dies a solution of partially polymerised allyl methacrylate in ethylene dichloride.

The dies may be formed of steel, glass, or any material capable of taking a high polish and capable of retaining the accuracy of their surfaces at the temperatures at which polymerisation takes place. The surfaces of the dies are ground to the curvatures which it is desired the final lens should have.

The nature of the invention will be appreciated from the following description of a method of making optical lenses having abrasion resisting surfaces, reference being made to the accompanying drawings, in which:

Figure 1 is a view partially in cross-section of a die unit in which the lens is formed;

Figure 2 shows diagrammatically an oven for polymerising the liquid within the die unit;

Figure 3 is a graph indicating the variation of temperature along the length of the oven.

Referring now to Figure 1, the lower die 12 is secured in the horizontal bed 13. Vertically mounted in the bed are the two pillars 14 carrying the platen 15 in which is held the upper die 16. The faces of the dies 14, 16 are ground to the curvatures which the lens is required to have. The compression helical springs 18, 19 are mounted on the pillars 14, springs 18 being restrained between the abutments 17 and the platen 15 and the springs 19 between the platen 15 and the bed 13. The surround 20 assists in aligning the dies, which are removable from the platen and bed.

The procedure for producing a lens is as follows:

The dies 12, 16 are removed and dipped in a container containing a solution of partially polymerised allyl methacrylate. The dies are then spun about their axes so that an even film 25, 26 of the solution is formed on the dies. The dies are replaced in their sockets in the platen 15 and bed 13 and liquid or semi-liquid partially polymerised methyl methacrylate monomer 24 poured on the lower die 12. The upper die 16 is lowered into position, the springs 18, 19 and the abutment 17 being adjusted to give the correct separation between the dies.

The whole apparatus is then placed in an oven for a time and at a temperature necessary to effect polymerisation and when polymerisation is effected the dies with the lens so formed between are removed and placed in cold water. The dies are then easily removable from the lens leaving a lens having a core of methyl methacrylate polymer and an optically accurate surface of abrasion resisting allyl methacrylate polymer, the films of allyl methacrylate polymer 25, 26 being transferred from the dies 12, 16 to the lens being formed during polymerisation.

The die 16 follows up any contraction occurring in the methyl methacrylate 24 during polymerisation thus ensuring the production of lens surfaces having curvatures corresponding to those of the dies.

By way of example the following method of preparing the solution for coating the dies is given:

25 grms. of allyl methacrylate monomer are mixed with 3.75 grms. of benzoyl peroxide and dissolved in 150 grms. of dry acetone. The mixture is refluxed steadily for 4½ hours. It is then cooled and 180 mls. of methanol added. The whole is poured into a mixture of 400 mls. of methanol and 125 mls. of water. The white precipitate so formed is filtered off, washed with methanol and dried. It is then re-dissolved in 190 mls. of acetone and 140 mls. of methanol is added. The mixture is again poured into 400 mls. of methanol mixed with 125 mls. water. The resultant precipitate of partially polymerised allyl methacrylate is filtered off, washed with methanol and dried.

The coating solution is made up by dissolving 5 grms. of the partially polymerised allyl methacrylate and 100 mls. ethylene dichloride and adding 5 grms. of benzoyl peroxide as catalyst.

The partially polymerised methyl methacrylate may be prepared as follows:

Methyl methacrylate monomer is mixed with 0.2% benzoyl peroxide and heated on a water bath until a thick syrup is obtained. This syrup is then degassed by subjecting it to a vacuum and cooled to room temperature.

With the coating solution and the partially polymerised methyl methacrylate prepared as described above, polymerisation of the material between the dies is effected by placing the apparatus in an oven kept at 50° C. for 12 hours. The temperature is then raised to 125° C. for one hour and subsequently allowed to cool to 50° C. The apparatus may be then removed from the oven and the dies separated from the lens.

Polymerisation may be effected by allowing the die units shown in Figure 1 to pass on a travelling belt through an oven shown diagrammatically in Figure 2. As there shown the units 21 carried on the traveling belt 22 pass through the oven 23. The oven is heated by two heating elements 27, 28, heating element 28 carrying a larger current than heating element 27. By this means, the temperature along the length of the oven varies as shown in Figure 3. The time for a unit 21 to pass from one end to the other of the oven is 14 hours, while the time during which the unit 21 is within the portion of the oven at an elevated temperature is 1 hour. When the units 21 emerge from the oven 23 polymerisation is complete and the dies may be separated from the lens by dipping in cold water as above described.

Dye may be inserted in the solution of allyl methacrylate by which tinted lenses may be produced.

Although the above description is restricted to the manufacture of optical lens it will be appreciated that such manufacture may be extended to prisms, flat or curved sheets or to any similar device used to refract, reflect or transmit light.

I claim:

1. A method of producing an optical element having a body of one transparent artificial resin and an external coating of another transparent artificial resin which method comprises the steps of coating the faces of a pair of optically accurate dies with a thin layer of a first polymerisable material, which, when polymerised, is transparent, inserting between the coated faces a quantity of a different polymerisable material in liquid form, which different material is transparent when polymerised, and polymerising simultaneously said polymerisable materials between said dies, whereby an element having a coating of said first polymerisable material is produced.

2. A method of producing an optical element comprising a body portion of a transparent artificial resin and an external coating of a transparent abrasion-resisting artificial resin, which method comprises the steps of coating the faces of a pair of optically accurate dies with a thin layer of a first polymerisable material, which, when polymerised, is a transparent abrasion-resisting material, inserting between the coated faces a quantity of liquid polymerisable material which, when polymerised, is transparent, and which is different from said first polymerisable material and polymerising simultaneously said polymerisable materials between said dies.

3. A method of producing an optical element as claimed in claim 2 wherein said first polymerisable material is a partially polymerised cross-linked resin.

4. A method of producing an optical element comprising a body portion of a transparent artificial resin and an external coating of a transparent abrasion-resisting artificial resin, which method comprises the steps of coating the faces of a pair of optically accurate dies with a thin layer of a first polymerisable material, which, when polymerised, is a transparent abrasion-resisting cross-linked resin, inserting between the coated faces a quantity of a liquid polymerisable material which, when polymerised, is a transparent thermoplastic material and polymerising simultaneously said polymerisable materials between said dies.

5. A method of producing an optical element as claimed in claim 4 wherein the said first polymerisable material is applied to the die face in solution with a solvent therefor.

6. A method of producing an optical element as claimed in claim 5 wherein said liquid polymerisable material is in a partially polymerized state.

7. A method of producing an optical element as claimed in 6 wherein said first polymerisable material is partially polymerised allyl methacrylate.

8. A method of producing an optical element as claimed in claim 7 wherein the partially polymerised allyl methacrylate is dissolved in ethylene dichloride prior to application to the surfaces of the dies.

9. A method of producing an optical element comprising a body portion of a transparent artificial resin and an external coating of a transparent abrasion-resisting artificial resin, which method comprises the steps of coating the faces of a pair of optically accurate dies with a thin layer of partially polymerised allyl methacrylate dissolved in ethylene dichloride, inserting between the coated faces a quantity of liquid partially polymerised methyl methacrylate and polymerising simultaneously said thin layer and said liquid partially polymerised methyl methacrylate between said dies.

10. A method of producing an optical element as claimed in claim 9 wherein said dies are formed from any material capable of taking a high polish.

11. A method of producing an optical element having a body of one transparent artificial resin and an external coating of another transparent artificial resin which method comprises the steps of coating the faces of a pair of optically accurate dies with a thin layer of a first polymerisable material, which, when polymerised, is transparent, inserting between the coated faces a quantity of a different polymerisable material in liquid form, which different material is transparent when polymerised, and carrying said dies with said polymerisable materials therebetween on a traveling belt within an oven maintained at a suitable temperature and for a suitable period of time for simultaneously polymerising said polymerisable materials.

12. A method of producing an optical element comprising a body portion of a transparent artificial resin and an external coating of a transparent abrasion-resisting artificial resin, which method comprises the steps of coating the faces of a pair of optically accurate dies with a thin layer of partially polymerised allyl methacrylate, inserting between the coated faces a quantity of monomeric methyl methacrylate and polymerising simultaneously said thin layer and said monomeric methyl methacrylate between said dies.

13. A method of producing an optical element as claimed in claim 12 wherein the dies are formed from any substance capable of taking a high polish.

14. A method of producing an optical element as claimed in claim 1 wherein said layer contains a dye whereby tinted optical elements are produced.

15. A method of producing an optical element as claimed in claim 2 wherein said layer contains a dye whereby tinted optical elements are produced.

JOHN JOHNSON.

REFERENCES CITED

The following references are of record in the file of this patent:

UNITED STATES PATENTS

| Number | Name | Date |
|---|---|---|
| 939,966 | Baekeland | Nov. 16, 1909 |
| 1,094,828 | Aylesworth | Apr. 28, 1914 |
| 2,063,315 | Kuettel | Dec. 8, 1936 |
| 2,241,415 | Moulton | May 13, 1941 |
| 2,322,310 | Muskat et al. | June 22, 1943 |
| 2,397,231 | Barnes | Mar. 26, 1936 |